US008912725B2

(12) United States Patent
Ye

(10) Patent No.: US 8,912,725 B2
(45) Date of Patent: Dec. 16, 2014

(54) PHOTOSWITCH

(75) Inventor: Xuanfeng Ye, Wenzhou (CN)

(73) Assignee: Qicheng Electrical Equipment Co., Ltd., Wenzhou (CN)

(*) Notice: Subject to any disclaimer, the term of this patent is extended or adjusted under 35 U.S.C. 154(b) by 0 days.

(21) Appl. No.: 13/995,544

(22) PCT Filed: Jul. 31, 2012

(86) PCT No.: PCT/CN2012/079426
§ 371 (c)(1),
(2), (4) Date: Jun. 19, 2013

(87) PCT Pub. No.: WO2013/189114
PCT Pub. Date: Dec. 27, 2013

(65) Prior Publication Data
US 2014/0015422 A1 Jan. 16, 2014

(30) Foreign Application Priority Data
Jun. 21, 2012 (CN) .......................... 2012 1 0207199

(51) Int. Cl.
H05B 37/02 (2006.01)
(52) U.S. Cl.
CPC ............. *H05B 37/0218* (2013.01); *Y02B 20/46* (2013.01)
USPC ............................ 315/158; 315/307; 315/291
(58) Field of Classification Search
CPC .................................................. H05B 37/0218
USPC ........... 307/117; 327/514; 315/158, 149, 150, 315/290, 151; 250/214, 214 R, 214 SW
See application file for complete search history.

(56) References Cited

U.S. PATENT DOCUMENTS 3,086,121 A * 4/1963 Cockrell ........................ 235/454
3,681,654 A * 8/1972 Quinn ............................ 315/151
(Continued)

FOREIGN PATENT DOCUMENTS

CN 2075404 U 4/1991
CN 2403180 Y 10/2000
(Continued)

OTHER PUBLICATIONS

International Search Report dated Jun. 21, 2012, issued by the China Patent Office in related Chinese Patent Application No. PCT/CN2012/079426 [English publication not available.] (4 pages).

*Primary Examiner* — Douglas W Owens
*Assistant Examiner* — Wei Chan
(74) *Attorney, Agent, or Firm* — Osha Liang LLP

(57) ABSTRACT

A photoswitch includes a DC power supply, a luminance controlling circuit and a lightening apparatus. The luminance controlling circuit includes a relay RL1, a trigger circuit module, a delay discharge circuit module, a photosensitive element and an adjusting circuit module. The trigger circuit module includes a NPN triode Q1, a NPN triode Q2, NPN triode Q3, a resistor R3 and a resistor R6; the adjusting circuit module includes a resistor R4 and a resistor R5 and a resistor R7, one end of which is in connection with the current output end of the resistor R4 and the other of is in connection with the current input end of the relay RL1; a current value of a subcircuit with the resistor R7 and the relay RL1 is smaller than a pull-in current value or a release current value of the relay RL1.

20 Claims, 2 Drawing Sheets

(56) References Cited

U.S. PATENT DOCUMENTS

| | | | |
|---|---|---|---|
| 5,038,079 A * | 8/1991 | Szuba | 315/158 |
| 5,552,676 A * | 9/1996 | Viljanen | 315/151 |
| 7,940,535 B2 * | 5/2011 | Itoh et al. | 363/21.12 |
| 8,026,470 B2 * | 9/2011 | Flaherty | 250/214 R |
| 8,304,996 B2 * | 11/2012 | Flaherty | 315/149 |
| 2001/0017525 A1 * | 8/2001 | Ito et al. | 315/158 |
| 2002/0113555 A1 * | 8/2002 | Lys et al. | 315/149 |
| 2009/0261660 A1 * | 10/2009 | Flaherty | 307/117 |
| 2013/0147350 A1 * | 6/2013 | Yang | 315/52 |

FOREIGN PATENT DOCUMENTS

| | | |
|---|---|---|
| CN | 2691208 Y | 4/2005 |
| CN | 2859988 Y | 1/2007 |
| CN | 101790271 A | 7/2010 |
| CN | 202603020 U | 12/2012 |
| GB | 2046538 A | 11/1980 |

* cited by examiner

PHOTOSWITCH

CROSS REFERENCE TO RELATED APPLICATIONS

This is a national stage application of PCT/CN2012/079426, filed on Jul. 31, 2012, which claims priority to Chinese Patent Application No. 201210207199.6, filed on Jun. 21, 2012. This application claims the benefits and priority of these prior filed applications and incorporates the disclosures of these prior filed applications by reference in their entirety.

FIELD OF THE INVENTION

The present invention relates to a device for switching a circuit, in particularly relates to a photoswitch.

DESCRIPTION OF THE RELATED ART

A photoswitch is a device for switching a lamp automatically in terms of illumination intensity of light, which may not only be labor saving, but also energy saving. Hence, it is widely used in our daily life. In order to achieve the purpose of saving energy, generally, the values of luminance intensity for turning on and off the lamp are different from each other, and may be set according to the conditions of the site. Currently, in the existing technologies, different luminance intensity values for turning on and off a lamp are set by using the control method for a dual circuit or a dual circuit-like circuit. For example, China patent literature with publication number CN2691208Y discloses a device for monitoring luminance in a classroom through light controlling lamps according to luminance requirements. The luminance values for turning on and off the lamps are controlled through two photoresistors, and the two photoresistors together with other elements form two controlling circuits, the switching of which are realized through a relay. In addition, China patent literature with publication number CN2859988Y discloses a desk lamp with controllable luminance. The luminance values for turning on and off the lamp are set by two resistor modules (both of which comprise a photoresistor), and the two resistor modules are in connection with a integrated circuit module, adapted for switching circuits.

Although the abovementioned device may set different luminance values for turning on and off a lamp, utilizing two photoresistors to form two control circuits for the luminance control may result in use of too many electronic elements, increase complexity of circuit, and raise the cost of production. Furthermore, too many electronic elements used may cause instability of the circuit.

SUMMARY OF THE INVENTION

In view of the above-described problems, one of the objectives of this invention is to provide a photoswitch with a simplified circuit, in order to solve problems of photoswitches of prior art utilizing two individual controlling circuits for turning on and turning off the lamp that is more complicated and expensive.

To achieve the above mentioned objectives, in accordance with one embodiment of this invention, there is provided a photoswitch, comprising a DC power supply, a luminance controlling circuit in electrical connection with the DC power supply, and a lightening apparatus controlled by the luminance controlling circuit; the luminance controlling circuit comprises a relay RL1, a trigger circuit module adapted for switching on or switching off the relay RL1, a delay discharge circuit module adapted for supplying power for the trigger circuit module and activating the trigger circuit module, a photosensitive element in series connection with the delay discharge circuit module, and an adjusting circuit module adapted for setting a value of luminance for turning on or turning off a light.

In a class of this embodiment, the contact of the relay RL1 in series connection with the lightening apparatus is adapted for switching on or switching off the lightening apparatus.

In a class of this embodiment, a current output end of the trigger circuit module is in connection with the relay RL1; and the trigger circuit module further comprises a NPN triode Q1 and a NPN triode Q2. The collector and the base of the triode Q1 are in connection with the positive electrode and the negative electrode of the delay discharge circuit module, respectively, and the collector of the triode Q1 is further in connection with the positive electrode of the DC power supply, and the emitter of the triode Q1 is in connection with the negative electrode of the DC power supply through a resistor R3, and the emitter of the triode Q1 is further in connection with the emitter of the triode Q2; the base of the triode Q2 is in connection with a current output end of a resistor R4, and the resistor R4 and a resistor R5 are in series connection with each other and arranged between the positive electrode and the negative electrode of the DC power supply, and the collector of the triode Q2 is in connection with the positive electrode of the DC power supply through a series resistor R6.

In a class of this embodiment, the trigger circuit module further comprises a PNP triode Q3. The base of the triode Q3 is in connection with the collector of the triode Q2, and the emitter of the triode Q3 is in connection with the positive electrode of the DC power supply, and the collector of the triode Q3 is in connection with the current input end of the relay RL1.

In a class of this embodiment, the adjusting circuit module comprises the resistor R4, the resistor R5 and a resistor R7, one end of which is in connection with a current output end of the resistor R4 and the other end is in connection with the current input end of the relay RL1; a current value of a subcircuit with the resistor R7 and the relay RL1 is smaller than a pull-in current value or a release current value of the relay RL1.

In a class of this embodiment, the delay discharge circuit module of the photoswitch comprises a capacitor C3; a resistor R1; and a resistor R2; one end of the capacitor C3 is in connection with the positive electrode of the DC power supply, and the other end of the capacitor C3 is in connection with the base of the triode Q1; the resistor R1 and the photosensitive element are in series connection with each other and arranged between the positive electrode and the negative electrode of the DC power supply; one end of the resistor R2 is in connection with the current output end of the resistor R1, and the other end of the resistor R2 is in connection with the base of the triode Q1.

In a class of this embodiment, the capacitor C3 may be an electrolytic capacitor, and the cathode of the capacitor C3 is in connection with the base of the triode Q1.

In a class of this embodiment, the resistor R7 may be a variable resistor; the contact of the relay RL1 may be a normally closed contact; and the photosensitive element may be a photoresistor, a photodiode or a phototriode.

In a class of this embodiment, the photoswitch further comprises a diode D2, the cathode of which is in connection with the current input end of the relay RL1, and the anode of which is in connection with the negative electrode of the power supply.

In a class of this embodiment, the photoswitch further comprises a power supply, a limited current circuit for limiting current and reducing voltage, and a rectification circuit for rectifying and filtering; the power supply is in electrical connection with the limited current circuit and the rectification circuit successively, so as to form the DC power supply.

In a class of this embodiment, the limited current circuit comprises a resistor R9 in connection with a live wire of the power supply, a capacitor C1 in series connection with the resistor R9, and a resistor R8 in parallel connection with the capacitor C1.

In a class of this embodiment, the rectification circuit comprises a diode D1, the anode of which is in connection with a current output end of the capacitor C1 and the cathode of which is in connection with the emitter of the triode Q3; a zener diode Z1, the cathode of which is in connection with the current output end of the capacitor C1 and the anode of which is in connection with the null line of the power supply; a capacitor C2, one end of which is in connection with the cathode of the diode D1 and the other end of which is in connection with the null line of the power supply.

In a class of this embodiment, the diode D1 may be replaced by a rectifier bridge BRIGE1.

In a class of this embodiment, the lightening apparatus may be an incandescent lamp, a LED lamp or an energy saving lamp.

In a class of this embodiment, the negative electrode of the DC power supply is earthed.

Advantages of this invention are summarized below:

① It is advantageous for the photoswitch of this invention, to comprise a DC power supply, a luminance controlling circuit in electrical connection with the DC power supply, and a lightening apparatus controlled by the luminance controlling circuit; the luminance controlling circuit comprises a relay RL1, a trigger circuit module adapted for switching on or switching off the relay RL1, a delay discharge circuit module adapted for supplying power for the trigger circuit module and activating the trigger circuit module, a photosensitive element in series connection with the delay discharge circuit module, and an adjusting circuit module adapted for setting a value of luminance for turning on or turning off a light; as the photoswitch of this invention only comprises one set of controlling circuit adapted for setting the luminance values of turning on and turning off the light, which has been considerable simplified comparing with the photoswitch of prior art having two sets of controlling circuits, in addition, the photoswitch of this invention comprises less numbers of electronic elements, so as to save cost and achieve higher electrical stability.

② It is advantageous for the photoswitch of this invention, to further comprise a delay discharge circuit module. When the lightening luminance changes, the changing of the voltage of the base of the triode Q1 may be delayed due to the discharge of the capacitor C1, which may avoid interference caused by short lightening from lamps of automobiles or other light sources, so that the lightening apparatus may not be turned off due to instantaneous lightening as well as being turned on due to the darkening of the instantaneous light. It is guaranteed that the photoswitch of this invention will be working at a stable state and the life of the lightening apparatus may be extended.

③ It is advantageous for the photoswitch of this invention, to further comprise a relay to control the turning on and off the lightening apparatus, and the controlling circuit module and the lightening circuit module are separated from each other, which remains the constancy of the current through the lightening circuit, so as to control a LED lamp, an energy saving lamp, an incandescent lamp and so on so as to expanding the using range of the photoswitch.

④ It is advantageous for the photoswitch of this invention, to further comprise a triode Q1 the emitter of which is in connection with the negative of the DC power supply through the resistor R3 that is adapted for limiting current, reducing current of the emitter of the triode Q1 so as to protect the electronic elements.

BRIEF DESCRIPTION OF THE DRAWINGS

Detailed description will be given below in conjunction with accompanying drawings.

Figure 1:
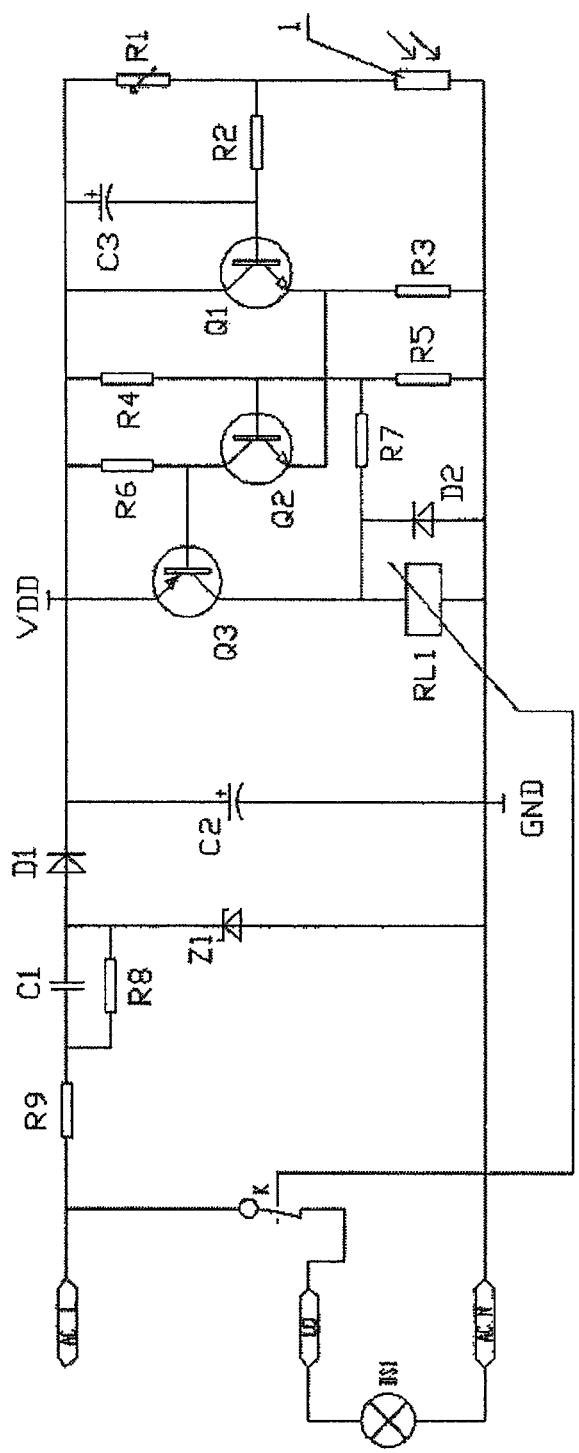
FIG. 1 is a circuit diagram of a photoswitch according to one embodiment of this invention.

In the drawings, the following reference number is used: 1-photosensitive element.

DETAILED DESCRIPTION OF THE EMBODIMENTS

Embodiment 1

Referring to FIG. 1, a preferred embodiment of this invention is showed. The photoswitch of this embodiment comprises a DC power supply, a luminance controlling circuit in electrical connection with the DC power supply, and a lightening apparatus controlled by the luminance controlling circuit; the luminance controlling circuit comprises a relay RL1, a trigger circuit module adapted for switching on or switching off the relay RL1, a delay discharge circuit module adapted for supplying power for the trigger circuit module and activating the trigger circuit module, a photosensitive element in series connection with the delay discharge circuit module, and an adjusting circuit module adapted for setting a value of luminance for turning on or turning off a light.

In this embodiment, the DC power supply supplies 24V obtained from an 110V AC power supply through a limited current circuit for limiting current and reducing voltage and a rectification circuit for rectifying and filtering, and the negative electrode of the DC power supply is earthed. The lightening apparatus is an energy saving lamp, and the photosensitive element 1 is a photoresistor.

The contact of the relay RL1 is in series connection with the lightening apparatus, adapted for switching on or switching off the lightening apparatus. In this embodiment, the contact of the relay RL1 is a normally closed contact The current output end of the trigger circuit module is in connection with the relay RL1. The trigger circuit module comprises a NPN triode Q1, a NPN triode Q2 and a PNP triode Q3. The collector and the base of the triode Q1 are in connection with the positive electrode and the negative electrode of the delay discharge circuit module, respectively, and the collector of the triode Q1 is further in connection with the positive electrode of the triode Q1; the emitter of the triode Q1 is in connection with the negative electrode of the DC power supply through the resistor R3; the emitter of the triode Q1 is further in connection with the emitter of the triode Q2. The base of the triode Q2 is in connection with the current output end of the resistor R4, and the resistor R4 and the resistor R5 are in series connection with each other and arranged between the positive electrode and the negative electrode of the DC power supply; the collector of the triode Q2 is in connection with the positive electrode of the DC power supply through a series resistor R6. The base of the triode Q3 is in connection with the collector of the triode Q2; the emitter of the triode Q2 is in connection with the positive electrode of the DC power supply and the collector of the triode Q3 is in connection with the current input end of the relay RL1.

The current output end of the delay discharge circuit module is in connection with the trigger circuit module. The delay discharge circuit module comprises a capacitor C3, a resistor R1 and a resistor R2. In this embodiment, the capacitor C3 is a electrolytic capacitor and one end (the anode) of the capacitor C3 is in connection with the positive electrode of the DC power supply, and the other end (the cathode) of the capacitor C3 is in connection with the base of the triode Q. The resistor R1 and the photosensitive element 1 are in series connection with each other and arranged between the positive electrode and the negative electrode of the DC power supply. One end of the resistor R2 is in connection with the current output end of the resistor R1, and the other end of the resistor R2 is in connection with the base of the triode Q1. The relay RL1 is a variable relay in order to facilitate the adjustment of the circuit.

The adjusting circuit module comprises the resistor R4, the resistor R5 and the resistor R7, one end of which is in connection with a current output end of the resistor R4 and the other end is in connection with the current input end of the relay RL1; the current value of the subcircuit with the resistor R7 and the relay RL1 is smaller than a pull-in current value or a release current value of the relay RL1. In this embodiment, as it is mentioned before, the contact of the relay RL1 is the normally closed contact so that the current value of the subcircuit with the resistor R7 and the relay RL1 is smaller than the pull-in current value of the relay RL1; and the resistor R7 is a variable resistor.

The photoswitch further comprises a diode D2, the cathode of which is in connection with the current input end of the relay RL1 and the anode of which is in connection with the negative electrode of the DC power supply.

The limited current circuit comprises a resistor R9 in connection with a live wire of the power supply, a capacitor C1 in series connection with the resistor R9, and a resistor R8 in parallel connection with the capacitor C1.

The rectification circuit comprises a diode D1, the anode of which is in connection with a current output end of the capacitor C1 and the cathode of which is in connection with the emitter of the triode Q3; a zener diode Z1, the cathode of which is in connection with the current output end of the capacitor C1 and the anode of which is in connection with the null line of the power supply; and a capacitor C2, one end of which is in connection with the cathode of the diode D1 and the other end of which is in connection with the null line of the power supply.

It is assumed that the required luminance for turning on the lamp is 10 Lux and the luminance for turning off the lamp is 30 Lux. Generally, the luminance for turning on the lamp may be set first and the luminance for turning off the lamp may be set thereafter. The specific steps for such setting are listed as follows.

Figure 2:
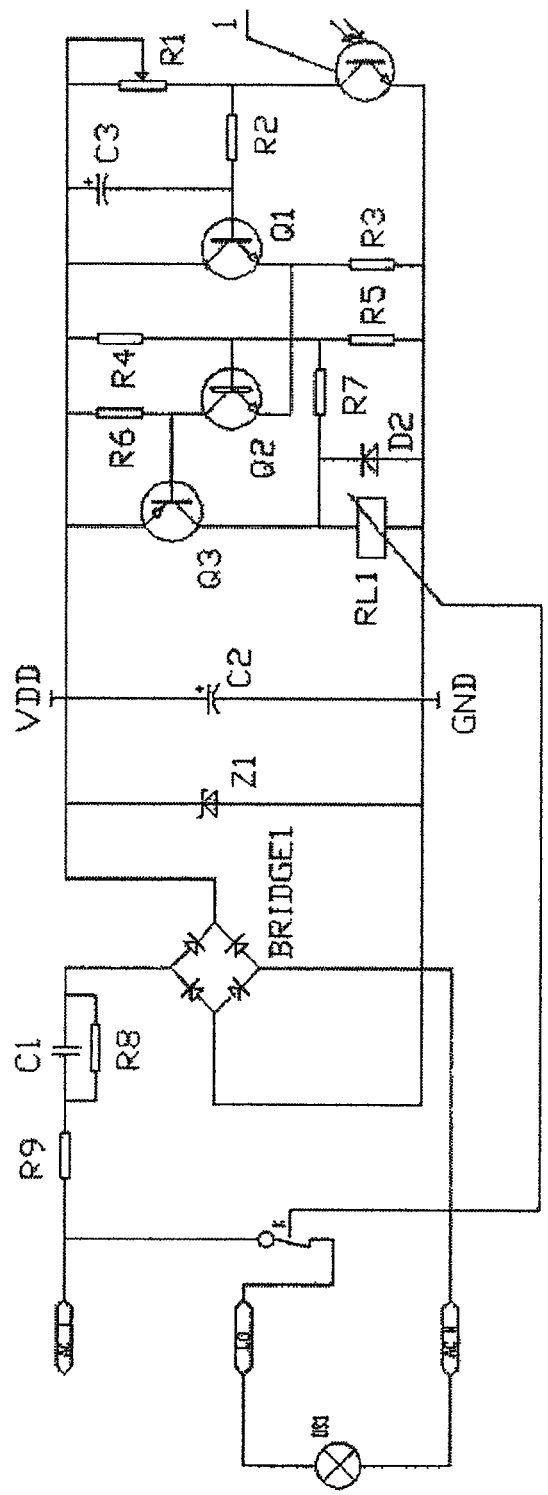
FIG. 2 is a circuit diagram of a photoswitch according to another embodiment of this invention.

Step 1. connecting all components of the circuits except the photoresistor according to the connecting rules shown in FIG. 2;

The value or type for every component may be chosen according to: $2 \leq R1 \leq 200$ KΩ, $10\Omega \leq R2 \leq 20$ MΩ, $10 \leq R3 \leq 100$ KΩ, $10\Omega \leq R4 \leq 100$ KΩ, $10\Omega \leq R5 \leq 100$ KΩ, $2\Omega \leq R6 \leq 10$ KΩ, $47\Omega \leq R7 \leq 200$ KΩ, $47\Omega \leq R8 \leq 2$ MΩ, $10\Omega \leq R9 \leq 200\Omega$, $0.1$ μF$\leq C1 \leq 2$ μF, $100$ μF$\leq C2 \leq 1000$ μF, $0.1$ μF$\leq C3 \leq 220$ μF, the nominal voltage of RL1 may be 5V, 12V, 24V or 48V, the nominal voltage of Z1 may be 5V, 12V, 24V or 48V. The type of triode Q1 and triode Q2 is 2SC1623 9014, and the type of triode Q3 is S8050 9013. The type of diode D1 and diode D2 is M7 or 1N4007;

in this embodiment, the preferred value or type for every component may be: R1=100 KΩ, R2=10 MΩ, R3=50 KΩ, 1R4=50 KΩ, R5=50 KΩ, R6=5 KΩ, R7=100 KΩ, R8=1 MΩ, R9=100Ω, C1=1 μF, C2=500 μF, C3=110 μF.

The nominal voltage of RL1 is 24V, the nominal voltage Z1 of is 24V, and the type of the diode D1 and diode D2 is M7; then adjusting the variable resistor R7 to the minimum value, so as to avoid any impact on the open and close of the relay RL1 during the adjustment of the resistor R7 from a minimum value to a maximum value.

Step 2. setting luminance value for switching on a lamp, wherein, the detailed steps for setting the luminance value comprises, firstly setting environment luminance at a value for example, 10 Lux, and preparing for a set of photoresistors with different resistance values for being connected into the circuit, after that, selecting a photoresistor with larger resistance value and connecting it into the circuit by connecting one end of the photoresistor with the current output end of the resistor R1 and the other end with the negative electrode of the DC power supply; if the lamp fails to shine, replacing a photoresistor with smaller photoresistance value for the one with larger resistance value; until the lamp starts to shine.

Step 3. setting luminance value for turning off the lamp, wherein, the detailed steps for setting the luminance value comprise, firstly, adjusting the environment luminance to a value, for example, 30 Lux, after connecting an appropriate photoresistor into the circuit, then gradually enlarging the resistance value of resistor R7 till the lamp goes out and after that recording the current resistance of the resistor R7.

The steps of setting luminance value for turning on and turning off the lamp are completed.

Embodiment 2

Referring FIG. 2, the components of this embodiment are basically the same as the embodiment 1, except:
(1) replacing the photoresistor with a phototriode, the collector of which is in connection with the current output end of the resistor R1 and the emitter is in connection with the negative electrode of the DC power supply.
(2) replacing the diode D1 with a rectifier bridge BRIGE1.
(3) The lightening apparatus is LED lamp.

The steps for setting luminance for turning on and turning off the lamp are the same as the steps mentioned in example 1.

In the other embodiment, the lightening apparatus may be an incandescent lamp. The photosensitive element 1 may be a photodiode.

In the other embodiment, the contact of relay RL1 may be normally open contact, and the current value of the subcircuit with the resistor R7 and the relay RL1 is smaller than a release current value of the relay RL1.

In the other embodiment, the power for the photoswitch may be supplied directly by the DC power supply, without the limited current circuit for limiting current and reducing voltage and the rectification circuit for rectifying and filtering that are used for changing the AC power to DC power.

Although the present invention has been described with particular reference to certain preferred embodiments thereof, variations and modifications of the present invention can be effected within the spirit and scope of the claims.

What is claimed is:

1. A photoswitch, comprising
a DC power supply, comprising a positive electrode and a negative electrode;
a luminance controlling circuit, in electrical connection with said DC power supply;
a lightening apparatus, controlled by said luminance controlling circuit;
wherein said luminance controlling circuit comprises a relay (RL1), comprising a current input end, a current output end and a contact;
a trigger circuit module, comprising a current output end, a NPN triode (Q1), a NPN triode (Q2), and a PNP triode (Q3), adapted for switching on or switching off said relay (RL1);
a delay discharge circuit module, comprising a positive electrode and a negative electrode, adapted for supplying power for said trigger circuit module and activating said trigger circuit module;
a photosensitive element (1), in series connection with said delay discharge circuit module; and
an adjusting circuit module, comprising a resistor (R4), a resistor (R5) and a resistor (R7), adapted for setting a value of luminance for turning on or off a light;
said contact of said relay (RL1), in series connection with said lightening apparatus, is adapted for switching on or switching off said lightening apparatus;
said current output end of said trigger circuit module is in connection with said relay (RL1);
a collector and a base of said triode (Q1) are in connection with said positive electrode and said negative electrode of said delay discharge circuit module respectively, and the collector of said triode (Q1) is further in connection with said positive electrode of said DC power supply, and a emitter of said triode (Q1) is in connection with said negative electrode of said DC power supply through a resistor (R3), and the emitter of said triode (Q1) is further in connection with the emitter of said triode (Q2);
a base of said triode (Q2) is in connection with a current output end of a resistor (R4), and said resistor (R4) and a resistor (R5) are in series connection with each other and arranged between said positive electrode and said negative electrode of said DC power supply, and a collector of said triode (Q2) is in connection with said positive electrode of said DC power supply through a series resistor (R6);
a base of said triode (Q3) is in connection with a collector of said triode (Q2), and an emitter of said triode (Q3) is in connection with said positive electrode of said DC power supply, and a collector of said triode (Q3) is in connection with said current input end of said relay (RL1);
a current output end of said delay discharge circuit module is in connection with said trigger circuit module;
one end of said resistor (R7) is in connection with a current output end of said resistor (R4) and the other end is in connection with said current input end of said relay (RL1);
a current value of a subcircuit with said resistor (R7) and said relay (RL1) is smaller than a pull-in current value or a release current value of said relay (RL1).

2. The photo switch of claim 1, wherein said delay discharge circuit module comprises
a capacitor (C3);
a resistor (R1); and
a resistor (R2); and
one end of said capacitor (C3) is in connection with said positive electrode of said DC power supply, and the other end of said capacitor (C3) is in connection with the base of said triode (Q1);
said resistor (R1) and said photosensitive element (1) are in series connection with each other and arranged between said positive electrode and said negative electrode of said DC power supply;
one end of said resistor (R2) is in connection with said current output end of said resistor (R1), and the other end of said resistor (R2) is in connection with the base of said triode (Q1).

3. The photoswitch of claim 2, wherein said capacitor (C3) is an electrolytic capacitor, and the cathode of said capacitor (C3) is in connection with the base of said triode (Q1).

4. The photoswitch of claim 1, wherein said resistor (R7) is a variable resistor; said contact of said relay (RL1) is a normally closed contact; and said photosensitive element (1) is a photoresistor, a photodiode or a phototriode.

5. The photoswitch of claim 1, further comprising a diode (D2), the cathode of which is in connection with said current input end of said relay (RL1), and the anode of which is in connection with said negative electrode of said power supply.

6. The photoswitch of claim 1, further comprising a power supply, a limited current circuit for limiting current and reducing voltage, and a rectification circuit for rectifying and filtering; said power supply is in electrical connection with said limited current circuit and said rectification circuit successively, so as to form said DC power supply.

7. The photoswitch of claim 6, wherein said limited current circuit comprises a resistor (R9) in connection with a live wire of said power supply, a capacitor (C1) in series connection with said resistor (R9), and a resistor (R8) in parallel connection with said capacitor (C1).

8. The photoswitch of claim 6, wherein said rectification circuit comprises:
a diode (D1), the anode of which is in connection with a current output end of said capacitor (C1) and the cathode of which is in connection with the emitter of said triode (Q3);
a zener diode (Z1), the cathode of which is in connection with said current output end of said capacitor (C1) and the anode of which is in connection with the null line of said power supply; and
a capacitor (C2), one end of which is in connection with the cathode of said diode (D1) and the other end of which is in connection with the null line of said power supply.

9. The photoswitch of claim 8, wherein said diode (D1) is replaced by a rectifier bridge BRIGE1.

10. The photoswitch of claim 1, wherein said lightening apparatus is an incandescent lamp, a LED lamp or an energy saving lamp.

11. The photoswitch of claim 1, wherein said negative electrode of said DC power supply is earthed.

12. The photoswitch of claim 2, wherein said resistor (R7) is a variable resistor; said contact of said relay (RL1) is a normally closed contact; and said photosensitive element (1) is a photoresistor, a photodiode or a phototriode.

13. The photoswitch of claim 3, wherein said resistor (R7) is a variable resistor; said contact of said relay (RL1) is a normally closed contact; and said photosensitive element (1) is a photoresistor, a photodiode or a phototriode.

14. The photoswitch of claim 2, further comprising a diode (D2), the cathode of which is in connection with said current input end of said relay (RL1), and the anode of which is in connection with said negative electrode of said power supply.

15. The photoswitch of claim 3, further comprising a diode (D2), the cathode of which is in connection with said current input end of said relay (RL1), and the anode of which is in connection with said negative electrode of said power supply.

16. The photoswitch of claim 4, further comprising a diode (D2), the cathode of which is in connection with said current input end of said relay (RL1), and the anode of which is in connection with said negative electrode of said power supply.

17. The photoswitch of claim 2, further comprising a power supply, a limited current circuit for limiting current and reducing voltage, and a rectification circuit for rectifying and filtering; said power supply is in electrical connection with said limited current circuit and said rectification circuit successively, so as to form said DC power supply.

18. The photoswitch of claim 3, further comprising a power supply, a limited current circuit for limiting current and reducing voltage, and a rectification circuit for rectifying and filtering; said power supply is in electrical connection with said limited current circuit and said rectification circuit successively, so as to form said DC power supply.

19. The photoswitch of claim 4, further comprising a power supply, a limited current circuit for limiting current and reducing voltage, and a rectification circuit for rectifying and filtering; said power supply is in electrical connection with said limited current circuit and said rectification circuit successively, so as to form said DC power supply.

20. The photoswitch of claim 7, wherein said rectification circuit comprises:
- a diode (D1), an anode of which is in connection with a current output end of said capacitor (C1) and an cathode of which is in connection with the emitter of said triode (Q3);
- a zener diode (Z1), an cathode of which is in connection with said current output end of said capacitor (C1) and an anode of which is in connection with the null line of said power supply; and
- a capacitor (C2), one end of which is in connection with the cathode of said diode (D1) and the other end of which is in connection with the null line of said power supply.

\* \* \* \* \*